(12) United States Patent
Cordatos

(10) Patent No.: US 8,066,800 B2
(45) Date of Patent: Nov. 29, 2011

(54) FILM-BASED SYSTEM AND METHOD FOR CARBON DIOXIDE SEPARATION

(75) Inventor: Haralambos Cordatos, Colchester, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 173 days.

(21) Appl. No.: 12/604,880

(22) Filed: Oct. 23, 2009

(65) Prior Publication Data

US 2011/0094379 A1 Apr. 28, 2011

(51) Int. Cl.
*B01D 53/22* (2006.01)
*B01D 71/06* (2006.01)

(52) U.S. Cl. ........ 95/51; 95/45; 95/266; 96/4; 96/7; 96/9; 96/11; 96/12; 502/4; 502/343

(58) Field of Classification Search ........ 95/45, 51, 95/266; 96/4, 7, 9, 11, 12, 13, 14; 422/168, 422/169, 170, 177; 423/220, 225, 226, 230; 502/4, 343

See application file for complete search history.

(56) References Cited

U.S. PATENT DOCUMENTS

| | | |
|---|---|---|
| 3,910,780 A | 10/1975 | Henley et al. |
| 4,705,544 A | 11/1987 | Okita et al. |
| 4,761,209 A | 8/1988 | Bonaventura et al. |
| 4,789,386 A * | 12/1988 | Vaughn et al. ........ 95/51 |
| 5,143,847 A | 9/1992 | Kawase et al. |
| 5,147,424 A | 9/1992 | Tsuchida et al. |
| 5,411,580 A | 5/1995 | Tsuchida et al. |
| 5,670,051 A | 9/1997 | Pinnau et al. |
| 6,143,556 A | 11/2000 | Trachtenberg |
| 6,524,843 B1 | 2/2003 | Blais et al. |
| 7,132,090 B2 | 11/2006 | Dziedzic et al. |
| 7,339,008 B2 | 3/2008 | Sanchez et al. |
| 7,582,137 B2 | 9/2009 | Chen et al. |
| 7,637,983 B1 * | 12/2009 | Liu et al. ........ 95/51 |
| 7,763,097 B2 * | 7/2010 | Federspiel et al. ........ 95/51 |
| 2004/0224396 A1 | 11/2004 | Maston |
| 2006/0100100 A1 * | 5/2006 | Morelli et al. ........ 502/343 |
| 2008/0003662 A1 | 1/2008 | Trachtenberg |
| 2009/0233155 A1 * | 9/2009 | Littau ........ 95/51 |
| 2010/0047866 A1 * | 2/2010 | Borchert et al. ........ 435/69.1 |
| 2010/0086983 A1 * | 4/2010 | Gellett et al. ........ 435/168 |

FOREIGN PATENT DOCUMENTS

EP 0511719 A2 11/1992

OTHER PUBLICATIONS

Baker, R. W., "Membrane Technology and Applications", 2nd Ed., Wiley 2004, pp. 301-353, 426-463.
"Bituminous Coal and Natural Gas to Electricity Final Report," DOE/NETL-2007/1281, vol. 1, 2007.
Benyus, J. M., "Biomimicry: Innovation Inspired by Nature", Perennial 2002, pp. 2-10, 285-297.

(Continued)

*Primary Examiner* — Jason M Greene
(74) *Attorney, Agent, or Firm* — Kinney & Lange, P.A.

(57) ABSTRACT

A method for separating $CO_2$ from a processed fluid includes exposing a film to the processed fluid and reacting the $CO_2$ with tetrahedrally coordinated zinc hydroxide moieties contained within the film to facilitate the transport of the $CO_2$ through the film.

21 Claims, 4 Drawing Sheets

OTHER PUBLICATIONS

Bounaceur, R. et al, "Membrane Processes for Post-combustion Carbon Dioxide Capture: A Parametric Study", Energy 31 (2006) 2220-2234.

"Carbon dioxide capture from existing coal-fired power plants", DOE/NETL-401/110907, 2007.

Craver, C. and Carraher, C. (Editors), "Applied Polymer Science: 21st Century", Elsevier 2000, pp. 677-705.

Kusumocahyo, S. P. et al, "Synthesis and Characterization of an Ultrathin Polyion Complex Membrane Containing β-Cyclodextrin for Separation of Organic Isomers", J. Mem. Sci. 230 (2004) 171-174.

Lindskog, S., "Structure and Mechanism of Carbonic Anhydrase," Pharmacol. Ther. vol. 74, No. 1, pp. 1-20, 1997.

Parkin, G., "Synthetic Analogues Relevant to the Structure and Function of Zinc Enzymes", Chem. Rev. 2004, 104, 699-767.

Powell, E. C. and Qiao, G. G., "Polymeric $CO_2$ / $N_2$ Gas Separation Membranes for the Capture of Carbon Dioxide from Power Plant Flue Gases", J. Mem. Sci. 279 (2006) 1-49.

Trachtenberg, M. C., et al, "Enzyme-based membrane reactor for CO2 capture," SAE 2003-01-2499, 2003.

Trofimenko, S., "Scorpionates: The Coordination Chemistry of Polypyrazolyl Borate Ligants," Imperial College Press, London 1999, pp. 13-25.

Van Der Sluijs, J. P. et al, "Feasibility of Polymer Membranes for Carbon Dioxide Recovery from Flue Gases", Energy Convers. Mgmt vol. 33, No. 5-8, pp. 429-436, 1992.

European Search Report of counterpart European Application No. 10251835 filed Apr. 20, 2010, 2011.

"Nat Carb: A national look at carbon sequestration" Retrieved Aug. 22, 2011 from <http://web.archive.org/web/20090620122836/http://www.natcarb.org/Atlas/sources.html> page updated Dec. 4, 2008.

"Emissions of Greenhouse Gases Report" U.S. Energy Information Administration: Environment. Retrieved Aug. 22, 2011 from <http://www.eia.gov/oiaf/1605/ggrpt/carbon.html>.

* cited by examiner

--Prior Art--

FILM-BASED SYSTEM AND METHOD FOR CARBON DIOXIDE SEPARATION

BACKGROUND

Due to global warming concerns, there has been an increased interest in technology for capturing and sequestering $CO_2$ from processed fluids. This can involve, for example, separating $CO_2$ from other molecules present in a processed fluid (i.e., "capturing" it) and then compressing it, transporting it, and disposing of it, for example, by burying it in the ground (i.e., "sequestering" it). Coal-fired power plants account for more than half of the ~3.8 billion tons of $CO_2$ emitted from stationary sources in the United States, and the relatively dilute concentration of $CO_2$ in their flue gas makes capture challenging. For example, $CO_2$ may comprise only 4-14% of the total flue gas being emitted from the power plant, but the energy required to capture it can comprise around 60% of the total cost of the entire capture and sequestration process. Typical polymer films used as membranes today can separate gaseous species only based on differences in their diffusivity and solubility. Since the molecular diameters of $CO_2$ and $N_2$ are very similar, separation of $CO_2$ by a polymer film is challenging, with $N_2$ being much more abundant and creating a higher driving force for permeation through the membrane.

Technologies have been developed to capture $CO_2$ using chemical scrubbing with chemicals having a selective and strong affinity for $CO_2$ molecules. Currently, the best available capture system employs amine-based chemical scrubbing. The technology is effective in removing $CO_2$; however, the cost is prohibitively expensive, estimated to be over $100 billion/year for U.S. Department of Energy's goal of 90% capture, and adding ~85% to the cost of electricity. The fundamental reason lies in the chemistry associated with the process, in which $CO_2$ is captured by reaction with 30% wt. aqueous amines. First, the kinetics of this process are inherently slow since the rate limiting step is transport through the liquid phase. Slow kinetics results in a need for large equipment to meet capture demands such as 90%, for example. Hence the capital costs associated with $CO_2$ capture for a 550 megawatt (MW) coal-fired power plant are estimated to be ~$740 MM. Second, the reaction products are relatively stable carbamate compounds which require large amounts of heat to release the $CO_2$ and regenerate the amines; incidentally, most of this energy is wasted since 70% of the mass to be heated is water. As a result, the efficiency of the same 550 MW plant would drop from 36.8% to 24.9%.

In contrast to amine-based chemistry, complex aerobic organisms (including mammals) react $CO_2$ with water toward the formation of bicarbonate ions, which are much more soluble in blood than $CO_2$ itself. The unaided reaction of $CO_2$ with water is slow, but in our body it happens almost instantaneously due to the action of carbonic anhydrase, one of the fastest enzymes known. Consequently, some groups have been investigating incorporating carbonic anhydrase in a membrane for $CO_2$ capture. The enzyme is essentially dissolved in a liquid phase inside the pores of a polymer film as a "contained liquid membrane". However, utilizing an enzyme outside the context of an organism (which can continuously regenerate and protect its enzymes with antioxidants) is a big challenge in terms of enzyme stability, availability and replenishment. The harsh environment of flue gases will be likely to chemically attack the embedded carbonic anhydrase enzyme. Such an approach will require tight control of temperature and contaminants, as well as provisions to replace denatured (degraded) enzyme at regular intervals. Since carbonic anhydrase is too complex to synthesize, its extraction from erythrocytes has significant costs, even if economies of scale are achieved.

Furthermore, carbonic anhydrase requires an aqueous environment to operate. This has two considerable drawbacks. First, like the liquid amines, the rate limiting step is transport through the liquid phase, which will set the ceiling for the membrane's performance regardless of how fast the enzyme converts $CO_2$ to bicarbonate ions. Second, as the liquid phase is kept at a minimum volume to improve kinetics, even extremely low levels of sulfur dioxide from the flue gas will accumulate over time and turn to sulfuric acid, quickly decreasing the pH below the narrow range for optimal carbonic anhydrase function in the membrane. As the enzyme progressively loses its catalytic activity, the efficiency of the process continues to decrease until the membrane is rendered non-functional. As a consequence, the membrane will need to be replaced frequently, leading to high operation costs.

SUMMARY

A $CO_2$ separation system comprises a film having a first side and a second side, a polymer matrix disposed between the first side and the second side, and zinc hydroxide moieties supported by the polymer matrix, each zinc hydroxide moiety in a tetrahedrally coordinated state and reactive with $CO_2$ to facilitate transport of the $CO_2$ from the first side to the second side.

In another aspect, a method of separating $CO_2$ from flue gas comprises exposing a front side of a film to a flue gas containing $CO_2$, and reacting the $CO_2$ in the flue gas with a set of tetrahedrally coordinated zinc hydroxide moieties in the film to selectively facilitate transport of a portion of the $CO_2$ from the front side to a back side of the film.

In yet another aspect, a method for separating $CO_2$ from a processed fluid comprises exposing a film to the processed fluid and reacting the $CO_2$ with tetrahedrally coordinated zinc hydroxide moieties contained within the film to facilitate the transport of the $CO_2$ through the film.

DETAILED DESCRIPTION

Figure 1A:
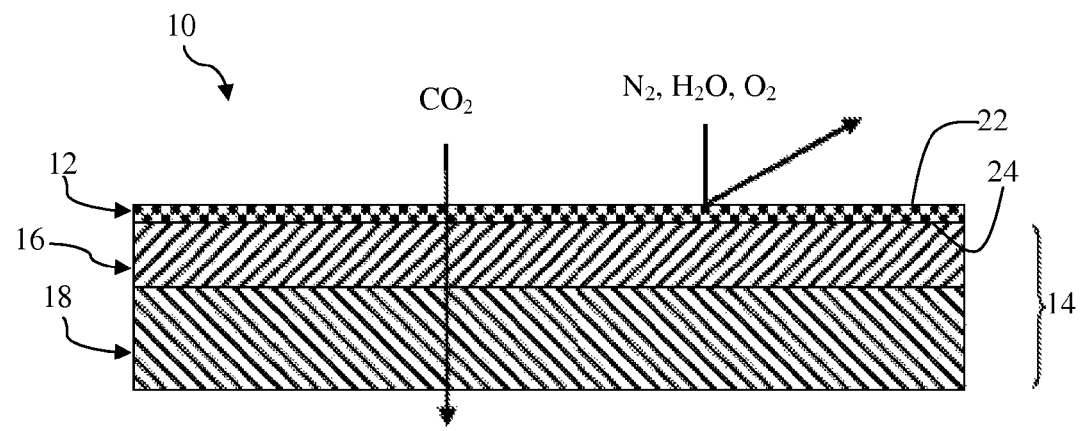
FIG. 1A is a schematic diagram showing the layers of a membrane-based $CO_2$ separation system including a $CO_2$ selective film.

FIG. 1A shows $CO_2$ separation system 10, film 12, substrate 14, backing layer 16, and support layer 18. Film 12 is non-porous, while substrate 14 and backing layer 16 are porous. Film 12 may be supported on polymeric microporous substrate 14 comprised of backing layer 16 and support layer 18. Backing layer 16 supports second side 24 of film 12. Backing layer 16 may comprise an anisotropic microporous membrane manufactured by a phase inversion method or other suitable method, and is commercially available from manufacturers such as Membrana GmbH of Wuppertal, Germany; Membrane Technology & Research of Menlo Park, Calif.; and PoroGen Inc. of Woburn, Mass.; etc. Backing layer 16 may have a thickness of about 50-75 microns and comprise chemically resistant polymers such as polysulfone, poly-vinilydene fluoride (PVDF), or poly-ether-imide, for example. To impart dimensional stability to film 12 and backing layer 16, substrate 14 on a flat-sheet format may also include highly porous support layer 18 such as a non-woven substrate, commercially available from Crane Nonwovens of Dalton, Mass.

Figure 1B:
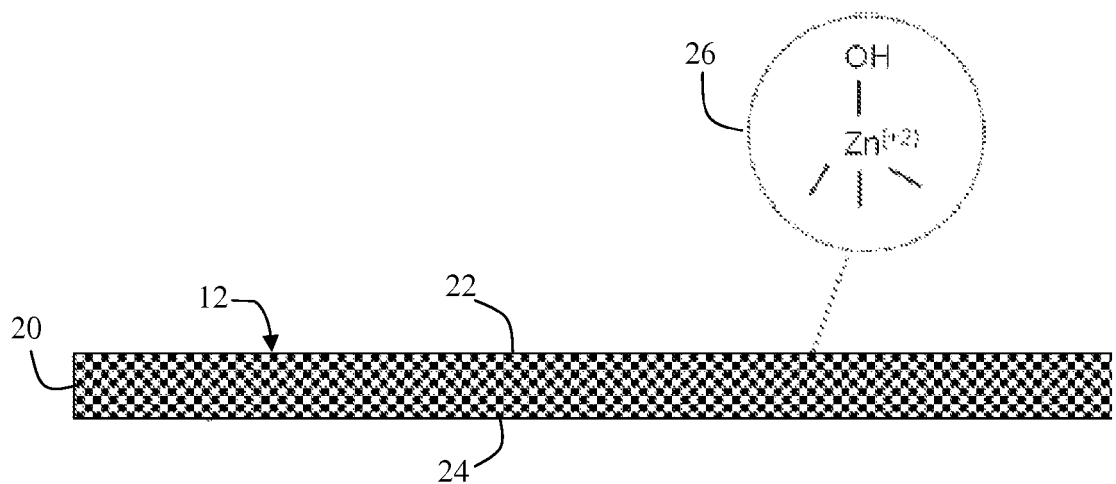
FIG. 1B is an enlarged view of the selective film shown in FIG. 1A.

FIG. 1B is a more detailed view of film 12, showing polymer matrix 20, first side 22 (or "front side"), second side 24 (or "back side"), and tetrahedrally coordinated zinc hydroxide moiety 26. Film 12 may have a total thickness of about 0.5 microns or less, for example, and includes polymer matrix 20 disposed between first side 22 and second side 24. Polymer matrix 20 supports a network of tetrahedrally coordinated bivalent zinc hydroxide moieties 26 in association with matrix 20 between first side 22 and second side 24. As described in more detail with reference to FIG. 2, each tetrahedrally coordinated zinc hydroxide 26 is a synthetic analogue of the active site of carbonic anhydrase, and its reactivity with $CO_2$ is used to increase selectivity of film 12 for $CO_2$ and facilitate its transport from first side 22 to second side 24 as shown in FIG. 1A. Furthermore, polymer matrix 20 acts as a barrier to substantially prevent the permeation of gases other than $CO_2$, such as nitrogen, water vapor, and oxygen in the case of flue gas from a power plant, for example. Hence, when a processed fluid containing carbon dioxide contacts first side 22, $CO_2$ will selectively permeate through film 12 to second side 24 so long as there is a $CO_2$ partial pressure difference between first side 22 and second side 24 to act as a driving force for permeation. This partial pressure difference may be created by pressurization of a processed fluid that contacts first side 22, and/or a vacuum applied to second side 24. Processed fluids may include but are not limited to exhaust from the combustion of hydrocarbon fuels such as flue gas from a coal fired power plant, or recyclable air used for breathing in outer space or underwater applications.

Figure 2:
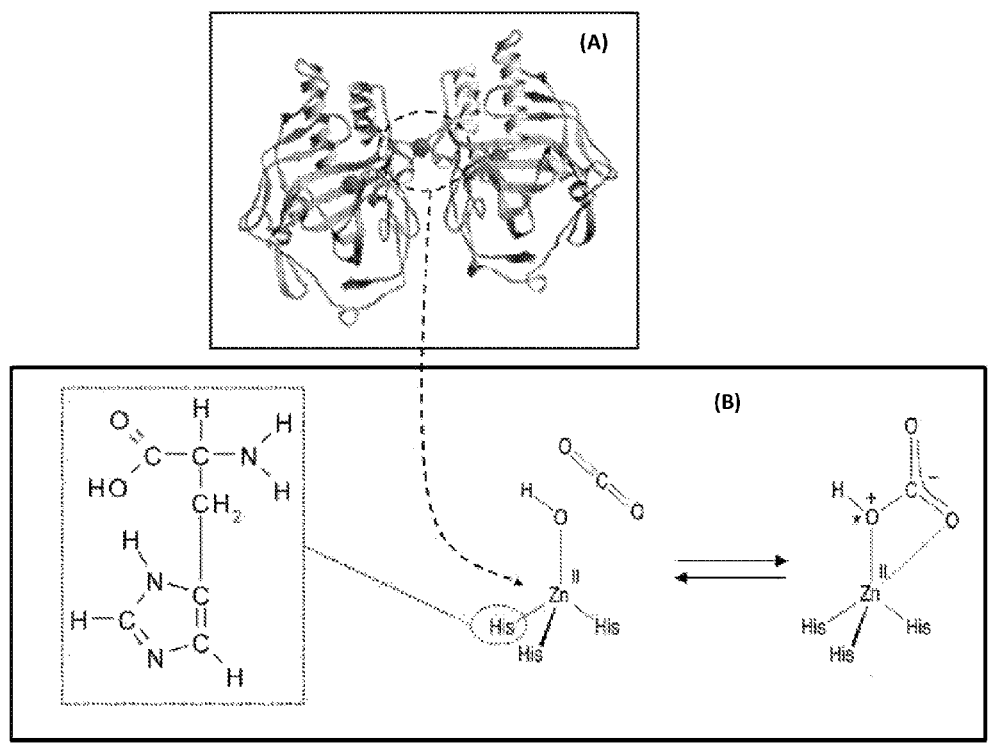
FIG. 2 is a schematic diagram showing the interaction of $CO_2$ with the active site of carbonic anhydrase.

FIG. 2 shows how the active site of carbonic anhydrase interacts with $CO_2$. In (A), a ribbon diagram of a representative variant of carbonic anhydrase is shown with the active site of the enzyme circled. As shown in (B), the active site of carbonic anhydrase is a single zinc atom tetrahedrally coordinated to the enzyme by the imidazole groups of three histidine residues. In the enzyme's internal environment, it is coordinated in such a way as to maximize its nucleophilicity, thereby becoming extremely efficient in attracting $CO_2$. As shown in (B), the fundamental basis for the reactivity of carbonic anhydrase with $CO_2$ at the first stage of its catalytic action is the stereochemistry of the divalent zinc-bound hydroxide ion active site. The interaction of $CO_2$ with zinc hydroxide in its tetrahedrally coordinated state results in formation of a transition state, predicted to be the configuration shown on the right in (B). This transition state is formed at extremely low activation energy and $CO_2$ is only very lightly bound to the hydroxide ion active site. The quick and reversible nature of $CO_2$ transition state formation with the zinc hydroxide active site allows carbonic anhydrase to be a highly efficient enzyme, converting about 600,000 $CO_2$ molecules every second to form bicarbonate ions. However, the complexity of the enzyme's entire structure for supporting the zinc hydroxide active site in a tetrahedrally coordinated state can happen by means of biochemical pathways only via self-assembly within the environment of an organism and cannot as of yet be efficiently reproduced in the laboratory.

In film 12, the benefits of carbonic anhydrase are utilized without the complications of using the enzyme itself and without the need for an aqueous environment in film 12. Tetrahedrally coordinated zinc hydroxide moieties 26 in polymer matrix 20 of film 12 function as synthetic analogues of the carbonic anhydrase active site, quickly and reversibly binding $CO_2$ with selective affinity to form temporary transition states. Because the transition states have low activation energy, the $CO_2$ is allowed to transfer or "hop" from one hydroxide ion to another, facilitating its transport from first side 22 to second side 24 through film 10. This is in contrast to amine-based membranes having both high activation energy and high affinity for $CO_2$, resulting in the production of relatively stable carbamate compounds requiring large amounts of heat to release the $CO_2$ and regenerate the amines for further $CO_2$ capture. In contrast to using the actual enzyme, tetrahedrally coordinated zinc hydroxide moieties 26 do not require water to be functional, because implementation of the embodiments of the present invention do not involve formation and release of bicarbonate ions. Thus, an aqueous environment is not required and their activity is not dependent on pH. This allows the encapsulation of zinc hydroxide moieties 26 in a robust film 12 that can withstand the harsh environment of processed fluids such as flue gases containing trace amounts of sulfur dioxide, thereby increasing the longevity of $CO_2$ separation system 10. Furthermore, using the techniques described herein, film 12 including tetrahedrally coordinated zinc hydroxide moieties 26 may be synthesized using commercially available ingredients in contrast to using carbonic anhydrase which requires production using a living organism. Hence, $CO_2$ separation system 10 represents a stable, efficient, and low cost system for capturing $CO_2$ from processed fluids that may meet the large scale demands of industry.

Figure 3:
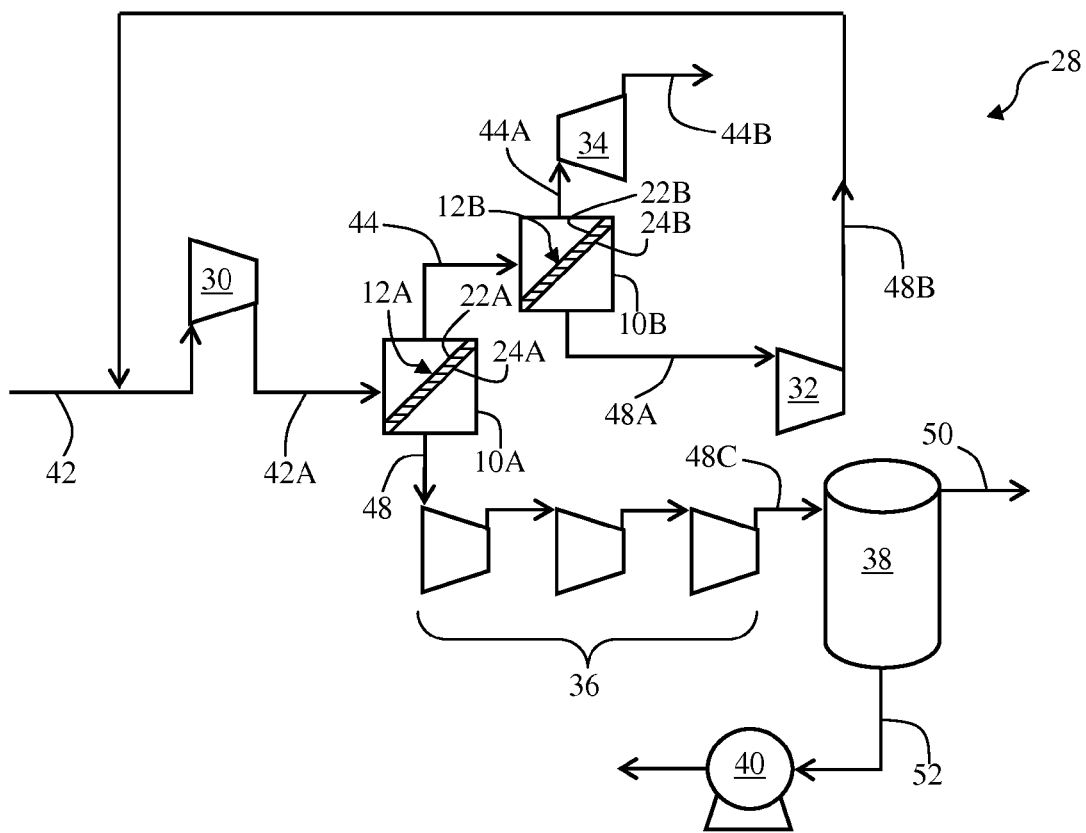
FIG. 3 is a schematic diagram of a notional carbon dioxide capture system for a power plant utilizing the $CO_2$ separation system of FIG. 1 for separating $CO_2$ from flue gas.

FIG. 3 shows an embodiment of the $CO_2$ separation system 10 described with reference to FIG. 1 and FIG. 2 utilized for separating $CO_2$ from the flue gas of power plant 28, including $CO_2$ separation system 10A with film 12A having first side 22A and second side 24A; $CO_2$ separation system 10B with film 12B having first side 22B and second side 24B; compressor 30; recycle compressor 32; expander 34; compressor train 36; condenser 38; and pump 40. Further shown is flue gas 42; pressurized flue gas 42A; flue gas residue 44 and 44A; expander exhaust 44B; permeate 48 and 48A; recycled permeate 48B; compressed permeate 48C; condenser exhaust 50; and liquefied $CO_2$ 52. For large power plants where the gas flow is too large for existing compressors, a number of compressors in parallel may be required.

Flue gas 42 containing $CO_2$, water vapor, $N_2$ and $O_2$, along with trace elements such as sulfur dioxide, enters compressor 30, which compresses flue gas 42 from one atmosphere to about three atmospheres of pressure, for example. Pressurized flue gas 42A is then supplied to $CO_2$ separation system 10A, where it contacts first side 22A of film 12A. As described previously in more detail with reference to FIG. 1 and FIG. 2, tetrahedrally coordinated zinc hydroxide moieties 26 present in film 12A selectively facilitate the transport of $CO_2$ from first side 22A to second side 24A, driven by the partial pressure of $CO_2$ in pressurized flue gas 42A. To ensure $CO_2$ stays present at a high partial pressure on first side 22A, compressor train 36 creates a negative pressure on second side 24A to draw away permeate 48 containing $CO_2$ molecules at higher concentration than in pressurized flue gas 42A. The $CO_2$ in permeate 48 is liquefied by the action of compressor train 36, which comprises a series of compressors that progressively pressurize permeate 48 to form compressed permeate 48C. Due to the high pressure of pressurized flue gas 42A in combination with inefficiencies in film 12A, permeate 48 and compressed permeate 48C will contain small amounts of water vapor, $N_2$ and $O_2$ in addition to the concentrated $CO_2$, which may be separated by condenser 38 and exhausted in condenser exhaust 50. Substantially pure compressed $CO_2$ may then be pumped by pump 40 for $CO_2$ sequestration methods.

Further shown in FIG. 3 is $CO_2$ separation system 10B used in series with $CO_2$ separation system 10A. Flue gas residue 44 containing a decreased amount of $CO_2$ from the separation by $CO_2$ separation system 10A is provided to $CO_2$ separation system 10B where it contacts first side 22B of film 12B. As described previously in more detail with reference to FIG. 1 and FIG. 2, tetrahedrally coordinated zinc hydroxide moieties 26 present in film 12B selectively facilitate the transport of $CO_2$ from first side 22B to second side 24B, driven by the partial pressure of $CO_2$ in flue gas residue 44. Although pressurized flue gas 42A will experience a slight pressure drop going through $CO_2$ separation system 10A, the remaining high pressure of flue gas residue 44 in combination with negative pressure created on second side 24B by the action of recycle compressor 32 ensures a sufficient partial pressure of $CO_2$ to drive it from first side 22B to second side 24B of film 12B. Permeate 48A containing $CO_2$ captured by film 12B is pressurized by recycle compressor 32, and recycled permeate 48B is then introduced into flue gas stream 42 for eventual separation by $CO_2$ separation system 10A. Preferably, $CO_2$ separation system 10B is configured to remove a level of $CO_2$ such that permeate 48A will contain about the same amount of $CO_2$ as flue gas 42, thereby preserving the $CO_2$ partial pressure balance required for efficient operation of $CO_2$ separation system 10A. This may be done, for example, by varying the surface area of film 12B relative to the surface area of film 12A based on a calculated efficiency of $CO_2$ separation for film 12B and 12A.

Flue gas residue 44A will still retain significant pressure despite the pressure drop experienced in $CO_2$ separation system 10A and 10B, and can be directed through expander 34 for the recovery of a portion of the energy invested into compressor 30 for pressurizing flue gas 42. Expander 34 may comprise a turbine, for example, that is driven by the expansion of flue gas residue 44A back to atmospheric pressure as it exhausts into the atmosphere as expander exhaust 44B. To meet $CO_2$ capture goals, it may be appreciated that any number of $CO_2$ separation systems 10A, 10B may be utilized, and may be coupled to auxiliary components that differ in configuration or type from that shown in FIG. 3.

Prophetic Examples for the Preparation of Film 12.

Figure 4:
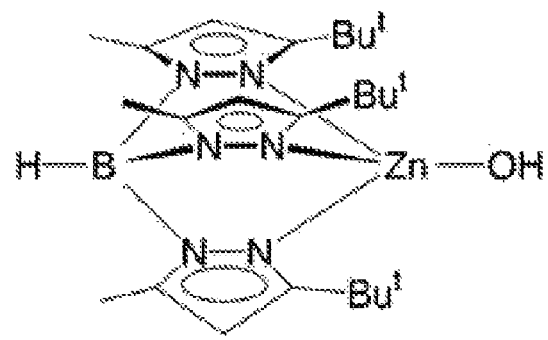
FIG. 4 is structural formula diagram showing a tridentate ligand bound to zinc hydroxide.

FIG. 4 shows an example of a tridentate ligand that may be used to support zinc hydroxide in a tetrahedrally coordinated manner in polymer matrix 20 of film 12, 12A, 12B. A tridentate ligand (also known as a "terdentate ligand") is a chelating agent having three groups capable of attachment to a metal ion, such as zinc, for example. More specifically, a class of tridentate ligands, known in the organometallic chemistry community as "scorpionates", may be used for purposes of the present disclosure. The most common class of scorpionates are tris-pyrazolyl hydroborates, for example, the methyl/tert-butyl substituted tris-pyrazolyl borate ligand bound to zinc hydroxide ("$[Tp^{t-Bu,Me}]ZnOH$") shown in FIG. 4. $[Tp^{t-Bu,Me}]ZnOH$ exhibits fast and reversible interaction with $CO_2$ to mimic the function of the carbonic anhydrase enzyme, and is just one example of a suitable tridentate ligand that may be used to keep zinc hydroxide moiety 26 in a tetrahedrally coordinated state in polymer matrix 20 of film 12. It may therefore be appreciated that although the examples below describe various alternative approaches for the preparation of film 12 utilizing a tris-pyrazolyl borate ligand, similar scorpionate ligands could also be utilized via similar methods, including but not limited to tris-imidazolyl-, tris-triazolyl- and tris-mercaptoimidazolyl-borates.

Example 1

Synthesis of a Tridentate Ligand, $[Tp^{t-Bu,Me}]ZnOH$

To synthesize $[Tp^{t-Bu,Me}]ZnOH$, a methyl, tert-butyl-substituted pyrazole, in particular 3-tert-butyl-5-methylpyrazole, is reacted with $KBH_4$ in a 6:1 mixture in nitrogen atmosphere (e.g. in a Schlenk tube) until the solid begins to melt (~186° C.). Excess pyrazole is removed by short path vacuum distillation (Kugelrohr) at 150° C. The residue is then dissolved in acetonitrile and the solution filtered and added dropwise to boiling heptane so that acetonitrile can distil out slowly. The cooled slurry is filtered and the product is reacted for 1 hour with $Zn(ClO_4)_2*6H_2O$ in a solution of KOH in methanol. The $[Tp^{t-Bu,Me}]ZnOH$ product is obtained as colorless crystals by concentrating the filtrate of the solution in vacuum at ambient temperature. All the raw materials required are commercially available except the substituted pyrazole which must be synthesized.

The substituted pyrazole may be made as follows: begin with a solution of hydrazine monohydrate in water and add 2,2 dimethyl-3,5 pentadione dropwise over a 20 minute period at ~15° C. The pyrazole product is precipitated after ~1 hour of continuous stirring when the solution is cooled to ~4° C. Equimolar quantities of the dione and hydrazine result in >90% yield of the pyrazole as a white solid. The substituted pyrazole prepared by this procedure can be used to prepare both the modified and unmodified $[Tp^{t-Bu,Me}]ZnOH$ discussed below in Example 2 and Example 3, respectively.

Example 2

Entrapment of Unmodified $[Tp^{t-Bu,Me}]ZnOH$ within a Polymer Matrix

Because the tert-butyl groups dominate the structure of $[Tp^{t-Bu,Me}]ZnOH$, the polymer matrix must be oleophilic to result in high compatibility and thereby best long-term retention. One example preparation is as follows: three commercially available oleophilic polymers, polypropylene (PP); polyethylene (PE); and Ethylene-Propylene-Diene-Monomer (EPDM) are dissolved in toluene or xylene in 30:20:50 PP:PE:EPDM weight fractions. The mixture is covered and stirred continuously for several hours at elevated temperature. When the solution is clear, $[Tp^{t-Bu,Me}]ZnOH$ is added slowly and stirring at elevated temperature continues for a few more hours. The amount of $[Tp^{t-Bu,Me}]ZnOH$ added is pre-measured to result in a 1-10% wt. loading in the film: higher loading may result in embrittlement while lower loading would not add significant benefit in terms of facilitated transport. The polymer solution is cast to form a thin film onto a commercially available ultrafiltration membrane, such as porous polysulfone, polyvinylidene-fluoride (PVDF), polyether-imide (PEI) and the like. A similar procedure can be followed with different oleophilic polymers or their blends. Blends which contain PP may benefit from addition of a small amount of antioxidant such as Ciba Irganox® (blend of hindered phenolic and phosphate antioxidants) to improve long-term thermal stability.

Example 3

Entrapment of Modified [Tp$^{t-Bu,Me}$]ZnOH within a Polymer Matrix

Figure 5:
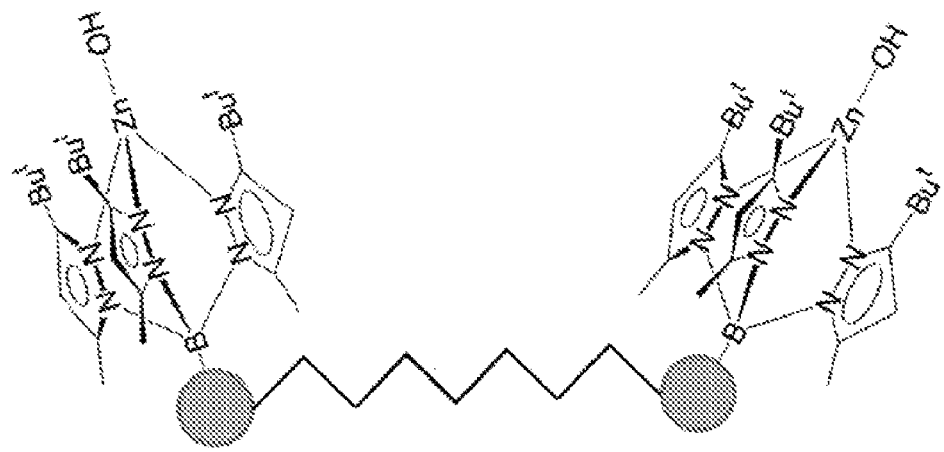
FIG. 5 is a structural formula diagram showing methyl/tert-butyl substituted tris-pyrazolyl borate bound to zinc hydroxide and grafted to each end of an oligomeric, oleophobic backbone.
Figure 6:
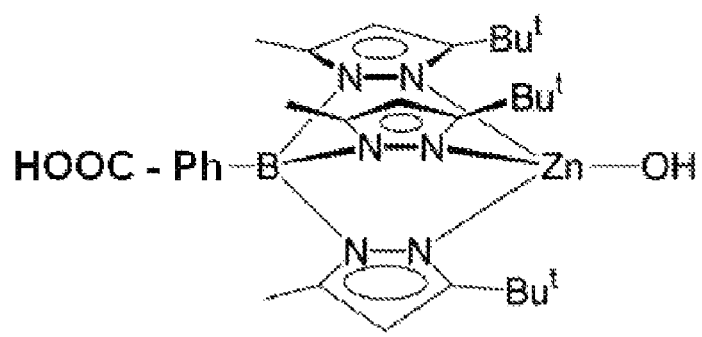
FIG. 6 is a structural formula diagram of a benzoic acid derivative of methyl/tert-butyl substituted tris-pyrazolyl borate bound to zinc hydroxide.

While unmodified [Tp$^{t-Bu,Me}$]ZnOH can be directly incorporated inside a polymer matrix in the manner described in Example 2, long-term performance of the resulting membrane may be limited since leaching of the active site outside the polymer framework is possible over time. Better entrapment in the polymer matrix can be achieved by grafting a [Tp$^{t-Bu,Me}$]ZnOH at each end of an oligomeric, oleophobic backbone, as shown conceptually in FIG. 5. While the [Tp$^{t-Bu,Me}$]ZnOH synthesized by the method of Example 1 is not conducive to chemical alteration, a better approach is to synthesize a new, benzoic acid derivative of [Tp$^{t-Bu,Me}$]ZnOH shown in FIG. 6, which can then be chemically linked to an oleophobic backbone. This derivative shown in FIG. 5 may be denoted as HOOC-Ph-[Tp$^{t-Bu,Me}$]ZnOH.

The Zn—OH site of one HOOC-Ph-[Tp$^{t-Bu,Me}$]ZnOH molecule could react with the COOH— site of another molecule. To circumvent this complication: first, prepare a zinc iodide substitute, i.e. HOOC-Ph-[Tp$^{t-Bu,Me}$]ZnI; second, link the iodide substitute to the functionalized backbone of choice; and finally replace the iodide ion with —OH.

The HOOC-Ph-[Tp$^{t-Bu,Me}$]ZnI can be made as follows: 3-tert-butyl-5-methylpyrazole is dissolved in diglyme (bis-2-methoxy-ethyl-ether) and heated to ~120° C. in a flask topped with distillation column. To this solution, 4-bromo-phenyl-boronic acid dissolved in 10% aqueous acetone is added dropwise. Acetone and water are removed from the reaction mixture by fractional distillation. The mixture is cooled and subsequently reacted with a dispersion of sodium hydride in mineral oil. After the foaming has subsided, the mixture is heated again and diglyme is removed by distillation. The Br-Ph-[Tp$^{t-Bu,Me}$]Na residue is obtained after cooling to ambient under nitrogen, washing with water, filtering the suspension and removing the water in vacuum.

Substitution of Na with ZnI could be accomplished by treating directly with ZnI$_2$ in THF (tetrahydrofuran) under appropriate reaction conditions; however, it may be necessary to replace Na with Tl (thallium) first by reacting Br-Ph-[Tp$^{t-Bu,Me}$]Na with TlNO$_3$ (thallium nitrate) in THF and stirring continuously for over two days to form Br-Ph-[Tp$^{t-Bu,Me}$]Tl, and then treating with ZnI$_2$ in THF. Solubility limitations will most likely result in reduced yields, hence gentle warming, continuous stirring and extended reaction time will be beneficial. Finally, Br— is replaced by HOOC— by treatment with n-BuLi (butyl-lithium) and excess CO$_2$ as commonly practiced in organometallic preparations.

Suitable preparation methods having reasonable yields may also be devised for other derivatives (i.e., with functionalities other than HOOC-Ph-). The HOOC— (carboxylic acid) functionality allows a number of reactions with a properly functionalized oleophilic "backbone" to form the tethered structure shown in FIG. 5. Of the various possibilities, amide and ester bonds are examples of linkages that have sufficient durability to withstand the conditions of the environment the membrane will be operating in. Formation of an ester linkage typically requires the presence of an acid as a catalyst; since the acid may interfere with the B—N bond in HOOC-Ph-[Tp$^{t-Bu,Me}$]ZnI the strategy that will be followed involves formation of an amide linkage. However, it may be appreciated that a different pathway which also does not interfere with the B—N bond and results in a robust linkage may be used.

One example of a functionalized oleophilic backbone is an aliphatic diamine: H$_2$N—(CH$_2$)$_x$—NH$_2$ where x is preferably between 6 and 10. An amide bond can then be formed between the amine functionality on each end of the diamine with the carboxylic acid of a HOOC-Ph-[Tp$^{t-Bu,Me}$]ZnI thereby resulting in the structure shown in FIG. 5. In this particular case, the chemical formula would be: (CH$_2$)$_x$—{HNOC-Ph-[Tp$^{t-Bu,Me}$]ZnI}$_2$ (x>6).

As is known to those in the art, amines react rapidly with acid chlorides, which are easily prepared from carboxylic acids, to form amides. However, the HCl (hydrochloric acid) generated in the reaction between the acid chloride and the amine could attack and hydrolyze the B—N bond in HOOC-Ph-[Tp$^{t-Bu,Me}$]ZnI. Addition of an acid scavenger may improve the yield. However, a better approach involves use of phosphonium salts in lieu of the acid chloride route. Phosphonium salts are efficient catalysts for amide bond formation with the combined benefit of improving yield and not generating HCl byproduct. In this procedure, the desired acid and amine are mixed in the presence of the salt; the deprotonated acid is first converted to an activated acyl-phosphonium species and then into a reactive ester which undergoes aminolysis. Phosphonium salts are efficient catalysts for amide bond formation with the combined benefit of improving yield and not generating HCl byproduct. A suitable reagent for amide bond formation is benzotriazol-1-yl-oxy-tris-pyrrolidino-phosphonium hexafluorophosphate, a.k.a. PyBop®.

Specifically, the diamine and the HOOC-Ph-[Tp$^{t-Bu,Me}$]ZnI can be dissolved in dichloromethane (DCM) along with PyBop® and Hünig's base (N,N diisopropyl-ethylamine). Preferably, HOOC-Ph-[Tp$^{t-Bu,Me}$]ZnI is at a 20% excess over the diamine. Also, a preferred mixture contains 2.5 eq. of Hünig's base and 2 eq. of PyBop® for every 5 eq. of HOOC-Ph-[Tp$^{t-Bu,Me}$]ZnI. Better results may be obtained if Hünig's base is added last, after the mixture has been flushed with dry N$_2$ in a flask covered with a septum. The mixture is stirred continuously for several hours at ambient temperature. Vacuum grease at the septum/flask interface helps prevent DCM from evaporating during the reaction. Separation of HOOC-Ph-[Tp$^{t-Bu,Me}$]ZnI at the end can be accomplished by evaporating the DCM and treating the precipitate with dilute acetic acid to remove the (protonated) Hünig's base, PyBop® and HOBt (N-hydroxy-benzotriazole) byproduct. The latter can be isolated from the liquid for recycling, while the solid is dissolved in toluene and treated with a 1M solution of Bu$_4$NOH (tetrabutylammonium hydroxide) in methanol to replace the iodide in (CH$_2$)$_x$—{HNOC-Ph-[Tp$^{t-Bu,Me}$]ZnI}$_2$ with —OH.

A thin film can now be formed following the procedure described in Example 2 using (CH$_2$)$_x$—{HNOC-Ph-[Tp$^{t-Bu,Me}$]ZnOH}$_2$ in lieu of unmodified [Tp$^{t-Bu,Me}$]ZnOH.

Example 4

Chemically Linking Modified [Tp$^{t-Bu,Me}$]ZnOH onto a Polymer

The preferred strategy is to react an activated form of HOOC-Ph-[Tp$^{t-Bu,Me}$]ZnI with a film-forming polymer which contains primary amine functionality in order to form amide linkages. As an example, the succinimidyl ester of HOOC-Ph-[Tp$^{t-Bu,Me}$]ZnI is such an activated form, which can be directly reacted with the primary amine functional unit of a macromolecule to form an amide bond. The ester can be made by reacting HOOC-Ph-[Tp$^{t\text{-}Bu,Me}$]ZnI with N,N'-disuccinimidyl carbonate in DCM. The dried ester can be stored and used in the subsequent steps.

Examples of film-forming polymers with primary amine functionality include poly-aminomethyl-methyl siloxane and amine-functional derivatives of poly-vinyl-alcohol (PVOH). However, not all film-forming amine-functional polymers would be suitable for this application: a low percentage of functional units would result in insufficient loading of Zn—OH sites which in turn would result in low performance enhancement compared to a thin film made by the unmodified polymer. For example, preparation of an amine-functionalized maleated polypropylene (PP) would result in a structure which contains less than 1% amine functional units. This is because maleated PP is made by reactive extrusion of PP with maleic anhydride and peroxide whereby the free radicals produced by the peroxide abstract hydrogen atoms from the carbon backbone of the PP yielding ~1 wt. % maleic anhydride groups. In this case, even a 100% conversion of the reaction between succinimidyl ester and the amine functional units would result in insufficient number of grafted Zn—OH functional units.

Poly-aminomethyl-methyl siloxanes (PAMMS) of the formula {(CH2NH2)CH2-Si—O}x-{CH3CH3-Si—O}y can be prepared as described by Elliot, U.S. Pat. No. 2,754,311, herein incorporated by reference, or obtained commercially from Siltech Corp. (Ontario, Canada) or Reliance Silicones (India). A preferred structure would result when x=1-2 and y=8-9. The succinimidyl ester of HOOC-Ph-[Tp$^{t\text{-}Bu,Me}$]ZnI and PAMMS are then dissolved in tetrachloroethane or similar solvent, covered and stirred continuously for a few hours. A slight excess of the ester (10-20%) and elevated temperature (~70° C.) may be beneficial. Addition of tetrabutylammonium hydroxide at the end of the reaction replaces ZnI with Zn—OH. The liquid phase is allowed to evaporate and the residue is washed with water to remove excess tetrabutylammonium hydroxide. The resulting structure would be: {(HNOC-Ph-[Tpt-Bu,Me]ZnOH)(CH3)-Si—O}x-{CH3CH3-Si—O}y.

Derivatives of PVOH with primary amine functionality can be formed either by co-polymerization as described by Robeson et al., U.S. Pat. No. 5,380,403, herein incorporated by reference, or by post-modification of PVOH as described by Dado et al., U.S. Pat. No. 6,107,401, herein incorporated by reference. In either case, the aminated polymer is treated with 10-20% excess of the succinimidyl ester of HOOC-Ph-[Tp$^{t\text{-}Bu,Me}$]ZnI in THF to create a "slurry". Elevated temperature, vigorous stirring and prolonged exposure may help improve the yield. The new polymer with HNOC-Ph-[Tp$^{t\text{-}Bu,Me}$]ZnI units is treated with a 1M solution of tetrabutylammonium hydroxide in methanol to yield PVOH with pendant HNOC-Ph-[Tp$^{t\text{-}Bu,Me}$]ZnOH units.

Example 5

Using Modified [Tp$^{t\text{-}Bu,Me}$]ZnOH with Other Monomers or Oligomers in a Polymerization Scheme to Form a Copolymer In this example, preparation of two similar polymers—a polyamide and a poly-ether-amide—will be described. In both cases, the succinimidyl ester of HOOC-Ph-[Tp$^{t\text{-}Bu,Me}$]ZnI is first reacted with the primary amine of an amino-dicarboxylic acid. The resulting monomer has two carboxylic acid functional groups along with the -Ph-[Tp$^{t\text{-}Bu,Me}$]ZnI connected to it by an amide bond. This monomer is subsequently reacted with the appropriate diamine to form a polyamide or a poly-ether-amide.

The selection of amino-dicarboxylic acid and diamine monomer "building blocks" can influence the rigidity of the polymer end-product. Typically, a balance between rigidity and flexibility is required for a polymeric membrane that exhibits both high permeance and structural integrity. To that end, one can use a blend of "rigid" and "flexible" monomers to obtain the optimal structure based on the selected end-use "trade-offs" between performance, ease of manufacture and longevity.

For this example, 2-amino-terephthalic acid (rigid) and amino-adipic acid (flexible) will be reacted separately with the succinimidyl ester of HOOC-Ph-[Tpt-Bu,Me]ZnI described previously in Example 4. The former will result in the structure:

(HOOC)$_2$-Ph-HNOC-Ph-[Tp$^{t\text{-}Bu,Me}$]ZnI     (1)

and the latter in the structure:

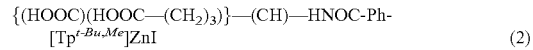
{(HOOC)(HOOC—(CH$_2$)$_3$)}—(CH)—HNOC-Ph-[Tp$^{t\text{-}Bu,Me}$]ZnI     (2)

The succinimidyl ester for (1) and (2), SA(1) and SA(2) respectively, are subsequently prepared by reacting (1) and (2) separately with N,N'-disuccinimidyl carbonate in DCM as discussed earlier in Example 4.

For preparation of a polyamide, a blend of SA(1) and SA(2) can be reacted with a diamine: the higher the SA(1)/SA(2) ratio the more rigid the structure of the polymer matrix. For yet more variability over the properties of the resulting structure, a blend of diamines could be used: for example, a combination of dianiline (rigid) and di-alkyl-amine (flexible) such as H$_2$N—(CH$_2$)$_x$—NH$_2$ where x is between 4 and 12 (the higher the x, the more flexibility in the structure). For preparation of a poly-ether-amide, at least one of the diamines contains an ether linkage, for example 4, 4' oxydianiline: H$_2$N-Ph-O-Ph-NH$_2$ or similar.

In the polymerization reaction, selection of the solvent is an important parameter: an unsuitable solvent could result in precipitation of the polymer before a high degree of polymerization has been attained; this in turn will result in poor film-forming properties which are important for successful casting of a thin membrane. A good solvent to carry out the polymerization would be N-methyl-pyrrolidinone, however those skilled in the art may prefer another appropriate mixture of solvents and additives. A higher degree of polymerization can also result when the number of amine functional units is slightly higher than the number of succinimidyl functional units in the starting solution. The polymer can be separated via precipitation from the solution by adding DI water or other suitable method; treatment with tetrabutylammonium hydroxide replaces ZnI with Zn—OH.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A $CO_2$ separation system comprising:
    a film having a first side and a second side, the film comprising a polymer matrix; and
    zinc hydroxide moieties supported by the polymer matrix, each zinc hydroxide moiety in a tetrahedrally coordinated state and reactive with $CO_2$ to facilitate transport of the $CO_2$ from the first side to the second side.

2. The $CO_2$ separation system of claim 1, further comprising a tridentate ligand bound to each zinc hydroxide moiety for keeping the zinc hydroxide moieties in the tetrahedrally coordinated state.

3. The $CO_2$ separation system of claim 2, wherein the tridentate ligand is a scorpionate.

4. The $CO_2$ separation system of claim 3, wherein the scorpionate is a tris-pyrazolyl hydroborate.

5. The $CO_2$ separation system of claim 4, wherein the tris-pyrazolyl hydroborate is methyl/tert-butyl substituted tris-pyrazolyl borate.

6. The $CO_2$ separation system of claim 5, wherein the methyl/tert-butyl substituted tris-pyrazolyl borate bound to a zinc hydroxide moiety is entrapped within the polymer matrix.

7. The $CO_2$ separation system of claim 5, wherein the methyl/tert-butyl substituted tris-pyrazolyl borate bound to a zinc hydroxide moiety is grafted to an end of an oligomeric, oleophobic backbone and entrapped within the polymer matrix.

8. The $CO_2$ separation system of claim 7, wherein the methyl/tert-butyl substituted tris-pyrazolyl borate bound to a zinc hydroxide moiety is a benzoic acid derivative of the methyl/tert-butyl substituted tris-pyrazolyl borate bound to a zinc hydroxide moiety.

9. The $CO_2$ separation system of claim 5, wherein the methyl/tert-butyl substituted tris-pyrazolyl borate bound to a zinc hydroxide moiety is chemically linked to the polymer matrix.

10. The $CO_2$ separation system of claim 5, wherein the methyl/tert-butyl substituted tris-pyrazolyl borate bound to a zinc hydroxide moiety is a monomer of the polymer matrix.

11. The $CO_2$ separation system of claim 1, further comprising a porous substrate for supporting the second side of the film.

12. The $CO_2$ separation system of claim 1, wherein a total thickness of the film is about 0.5 microns or less.

13. A method of separating $CO_2$ from flue gas, comprising:
    exposing a front side of a first film to a flue gas containing $CO_2$; and
    reacting the $CO_2$ in the flue gas with a first set of tetrahedrally coordinated zinc hydroxide moieties in the first film to facilitate transport of a first portion of the $CO_2$ from the front side of the first film to a back side of the first film.

14. The method of claim 13, further comprising pressurizing the flue gas prior to exposing the front side of the first film to the flue gas.

15. The method of claim 13, further comprising applying a negative pressure to the back side of the first film to draw the first portion of the $CO_2$ away from the back side of the first film.

16. The method of claim 15, further comprising compressing the first portion of the $CO_2$ after it has been drawn away from the back side of the first film.

17. The method of claim 13, further comprising:
    exposing the flue gas to a front side of a second film after it has been exposed to the front side of the first film; and
    reacting the $CO_2$ in the flue gas with a second set of tetrahedrally coordinated zinc hydroxide moieties in the second film to facilitate transport of a second portion of the $CO_2$ from the front side of the second film to a back side of the second film.

18. The method of claim 17, further comprising applying a negative pressure to the back side of the second film to draw the second portion of the $CO_2$ away from the back side of the second film.

19. The method of claim 18, further comprising mixing the second portion of the $CO_2$ with the flue gas prior to exposing the front side of the first film to the flue gas.

20. The method of claim 17, further comprising exhausting the flue gas to atmosphere after exposing the flue gas to the front side of the second film.

21. A method for separating $CO_2$ from a processed fluid, comprising:
    exposing a film to a processed fluid containing $CO_2$; and
    reacting the $CO_2$ with tetrahedrally coordinated zinc hydroxide moieties contained within the film to facilitate the transport of the $CO_2$ through the film.

* * * * *